United States Patent
Jones et al.

[11] Patent Number: 5,216,249
[45] Date of Patent: Jun. 1, 1993

[54] DIAMOND NEUTRON DETECTOR

[75] Inventors: Barbara L. Jones, Forest Park, England; Tom L. Nam; Rex J. Keddy, both of Transvaal, South Africa

[73] Assignee: De Beers Industrial Diamond Division (Proprietary) Limited, Transvaal, South Africa

[21] Appl. No.: 772,279

[22] Filed: Oct. 7, 1991

[30] Foreign Application Priority Data

Oct. 5, 1990 [GB] United Kingdom ............. 9021689

[51] Int. Cl.$^5$ .................... G01T 1/11; G01T 3/00; G01T 3/08
[52] U.S. Cl. .................. 250/370.05; 250/390.01; 250/484.1
[58] Field of Search ........... 250/370.05, 484.1 A, 250/390.01

[56] References Cited

U.S. PATENT DOCUMENTS

| | | | |
|---|---|---|---|
| 3,805,078 | 4/1974 | Kozlov ................... | 250/370.05 |
| 4,754,140 | 6/1988 | Nam et al. ............... | 250/484.1 A |
| 4,981,818 | 1/1991 | Anthony ................. | 357/81 |
| 5,099,296 | 3/1992 | Mort et al. .............. | 357/4 |

OTHER PUBLICATIONS

*The Detection of Ionizing Radiations by Natural and Synthetic Diamond Crystals and their Application as Dosimeters in Biological Environments*, Keddy, Nam and Burns, published in Carbon, vol. 26, No. 3, pp. 345-356 (1988).
*Detector Assembly with a Diamond Detector for Recording Neutrons*, by Luchanskii, Martynov, Khrunov, and Chekhlaev, translated from Atomnaya Energiya, vol. 53, No. 2, pp. 132-133 (1987).
*Synthetic Diamonds as Dosimeters in Biological Environments*, by R. J. Keddy, pp. 1-16, chapter of Advances in Ultrahard Materials, vol. 4, edited by Chris Barrett, De Beers Industrial Diamond Division.

*Primary Examiner*—Carolyn E. Fields
*Attorney, Agent, or Firm*—Scully, Scott, Murphy & Presser

[57] ABSTRACT

A neutron detector is formed from a layer of polycrystalline diamond which is deposited by a chemical vapor deposition process. The diamond material contains $^{10}$B as a dopant, in a concentration of 1,000 ppm or less. In one embodiment, the layer of diamond material is deposited on a supporting substrate. Advantageously, the substrate itself may comprise a layer of diamond material. In another embodiment, the substrate comprises a layer of conductive or semiconductive material. The diamond material is deposited on top of the substrate, with at least two regions in contact with the semiconductive material. A central portion of the semiconductive material is etched away, and electrical contacts are applied to the remaining portions of the semiconductive substrate. An advantage of the neutron detector of the invention is that the diamond layer is very thin, less than 50 μm thick, so that the sensitivity of the detector to other radiation, particularly γ radiation, is reduced.

19 Claims, 2 Drawing Sheets

… (continued)

DIAMOND NEUTRON DETECTOR

BACKGROUND OF THE INVENTION

This invention relates to a neutron detector formed from diamond.

It has been proposed to create a neutron detector which comprises a diamond crystal, a surface layer of which is doped with $^{10}B$ or another neutron-sensitive material. Such a device is described in U.S. Pat. No. 3,805,078 to Koslov. However, the device described in this patent specification is relatively complex, and only a relatively small portion of the diamond crystal is actually sensitive to neutron radiation. It has also been proposed to utilise a diamond sheet implanted with boron ions for detecting neutrons. A device of this kind is described in an article by A E Luchanskii et al in Atomnaya Energiya, Vol 63, No. 2, pp 132–133, August, 1987. It has also been proposed by R J Keddy, T L Nam and R C Burns (Carbon, Vol 26, No. 3, pp 345–356, 1988) and by R J Keddy (Advances in Ultra-hard Materials Applications Technology, 1988, De Beers Industrial Diamond Division (Proprietary) Limited) to use diamond crystals as neutron detectors.

Efforts continue to be made to increase the sensitivity of detectors to neutron radiation and to reduce their sensitivity to other radiation, particularly $\gamma$ radiation.

SUMMARY OF THE INVENTION

According to the invention a neutron detector comprises a layer of polycrystalline diamond material deposited by a chemical vapour deposition (CVD) process, the diamond material containing $^{10}B$ as a dopant.

The $^{10}B$ concentration is preferably 1,000 ppm or less.

The total boron concentration is preferably 5,000 ppm or less.

The diamond layer may be deposited on a supporting substrate, or a free-standing diamond layer may be formed by first depositing a diamond film on a substrate and then separating at least a portion of the diamond layer from the substrate. Typically, part of the substrate is removed, leaving a supporting ring or strip attached to the diamond layer.

Electrical contacts may be applied to the diamond layer to form a conduction mode detector, or the detector may be used in a thermoluminescent mode.

DESCRIPTION OF EMBODIMENTS

Figure 1:
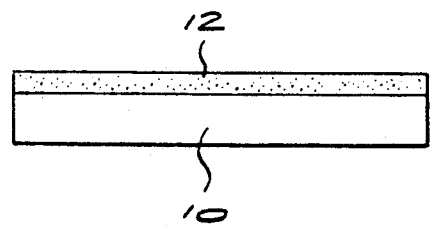
FIG. 1 is a schematic side view of a thermoluminescent mode neutron detector according to the invention.

Boron doped diamond neutron detectors rely on the reaction $^{10}B(n,\alpha)^7Li$, whereby a $^{10}B$ atom which is struck by a neutron captures the neutron and emits an alpha particle, and is converted to $^7Li$. The energy required to form an electron/hole pair in diamond is three times the band gap, that is, approximately 18 eV. Each alpha particle released has 2,4 MeV energy. Therefore, for every alpha particle produced, approximately $10^5$ electron/hole pairs are produced.

According to the present invention, a diamond neutron detector is formed utilising a chemical vapour deposition (CVD) process, to form a thin diamond layer or film. During the CVD process, $^{10}B$ is introduced into the layer by introducing, for example, $^{10}B_2H_6$ into the CVD reaction vessel as a dopant gas. Other gases containing $^{10}B$ can be used. The result is a thin diamond layer which is uniformly doped with $^{10}B$. This contrasts with prior art detectors, comprising a relatively thick diamond crystal with a relatively thin doped layer.

It is desirable for the diamond film to be as thin as possible, to minimize the detection of $\gamma$ photons. The thickness of the film is less than 50 $\mu$m, and typically between 2 and 30 $\mu$m. This allows a high rate of collection of alpha particles, but a low rate of $\gamma$ photon detection of less than 0,1% and typically 0,03%. Thus, the detector discriminates well against $\gamma$ photons.

In an alternative version of the process, the diamond layer is deposited undoped, and is subsequently implanted with $^{10}B$ ions. The thinness of the layer ensures that the implantation is substantially uniform over the depth (thickness) of the layer.

The diamond film can be free-standing or may be supported by a substrate. Firstly, it is possible to form a free-standing or unsupported diamond film as described in European patent application no. 0400947. This involves depositing a diamond film on a thin carbide layer, which has previously been deposited on a substrate. The substrate and the carbide layer can subsequently be removed, leaving a free-standing film. The resultant film can have electrical contacts applied to it, and has good resistivity characteristics of 0.1 k$\Omega$m to 1,000 k$\Omega$m.

A free-standing diamond film as described above is not suitable for use as a thermoluminescent detector, since it tends to curl up when heated to temperatures in the region of 500° C. To provide a thermoluminescent detector, therefore, the diamond film is deposited on a supporting substrate which is not activated by neutron or $\gamma$ radiation. For example, the substrate could be composed of graphite, silicon nitride, silicon carbide or aluminium nitride. The substrate supports the diamond when it is heated. In the case of a thermoluminescent detector, it is not important whether the substrate is insulating or conductive.

In the case of a conduction mode detector, the substrate must have sufficiently high resistivity, preferably above $10^{10}\Omega$m, and electrical contacts are applied to the diamond layer. A conductive substrate can also be used, provided that an insulating layer is used to insulate the diamond layer electrically from the substrate. Such an insulating layer can be provided by forming a thin high-temperature polyimide layer (say, 50 $\mu$m thick) on the conductive substrate before depositing the diamond layer on the substrate. The polyimide layer can comprise Kapton (trade mark). Alternatively, a ceramic layer (e.g. silicon carbide or silicon nitride) can be used as an insulating layer.

The concentration of $^{10}B$ in the diamond film is preferably 1,000 ppm or less. Together with the $^{10}B$ will be a relatively large percentage of $^{11}B$. Preferably, the total boron concentration will be 5,000 ppm or less.

Diamond is well suited for use as a neutron detector, since it is resistant to neutron damage and will not degrade rapidly in use. Diamond is also able to withstand relatively high temperatures, typically up to 500° C.

The final device is small and can be incorporated in other instrument probes, so that it is readily accommodated in existing equipment.

FIG. 1 illustrates a first version of a neutron detector according to the invention, which is used in a thermoluminescent mode. The detector comprises a ceramic substrate 10, typically comprising silicon nitride or silicon carbide, on which a diamond film 12 is deposited by a CVD process. The diamond film can be doped during the CVD process, or by subsequent ion implantation, as described above. The thickness of the ceramic substrate 10 is typically from 0,2 to 1 mm, while the diamond layer 12 has a typical thickness of between 2 and 30 μm. The detector is typically circular in plan, with a diameter of from 1 to 10 mm. Prior to the deposition of the diamond layer on the substrate, the substrate is ground flat so that it has surface irregularities of less than 2 μm. In some cases, it may be desirable to deposit the diamond layer 12 onto a substrate other than a ceramic substrate, such as a polycrystalline diamond (PCD) layer, which facilitates growing of the diamond layer on the substrate.

Figure 2A:
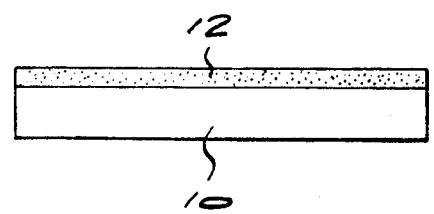
FIGS. 2a to 2d illustrate the formation of a first version of a conduction mode neutron detector according to the invention.
Figure 2B:
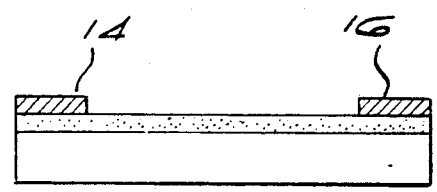
Figure 2C:
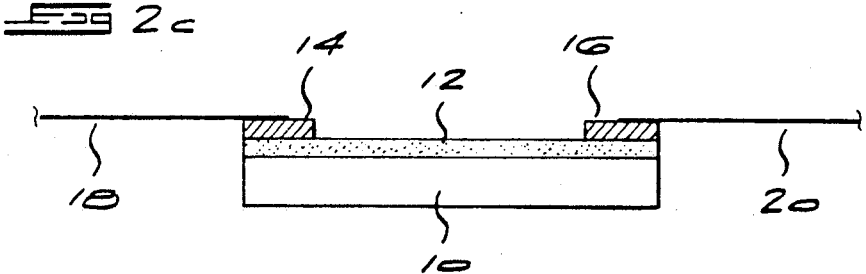
Figure 2D:
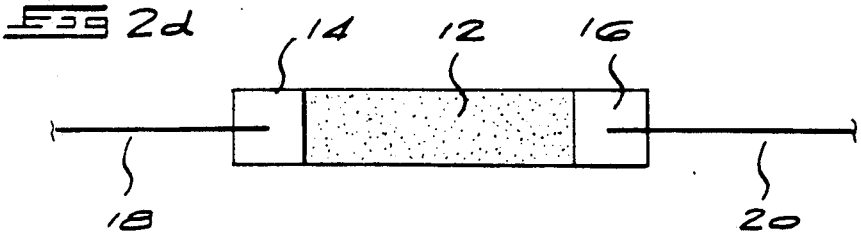

FIGS. 2a to 2d illustrate the formation of a conduction mode neutron detector according to the invention. Similarly to the procedure described above, a polycrystalline diamond layer 12 is deposited on a supporting substrate 10, as shown in FIG. 2a. Next, as shown in FIG. 2b, metallic contacts 14 and 16, comprising an aluminium layer approximately 1 μm thick, are deposited onto opposite ends of the diamond layer 12. As shown in FIG. 2c, fine metal conductors 18 and 20 are bonded to the contacts 14 and 16, to enable the detector to be connected to a conventional electronic conduction mode measurement circuit. FIG. 2d is a top view of the detector shown in FIG. 2c. The prototype detector is elongate, with a length of approximately 2 to 3 mm and a width of approximately 1 mm.

Figure 3A:
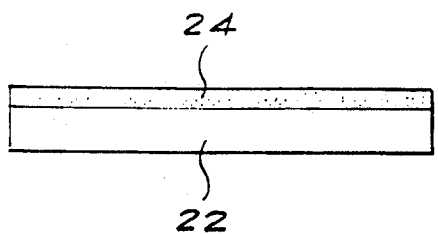
FIGS. 3a to 3d illustrate the formation of a second version of a conduction mode neutron detector according to the invention.
Figure 3B:
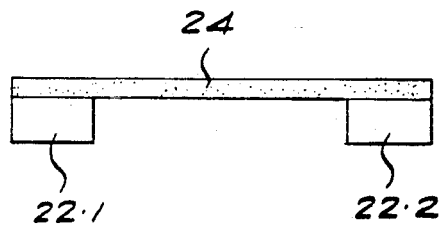
Figure 3C:
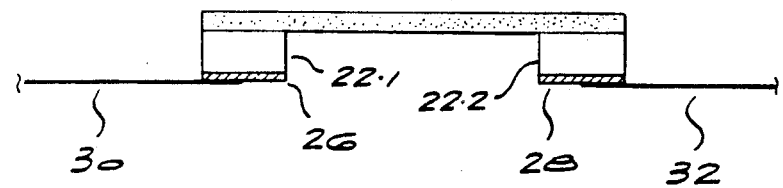
Figure 3D:
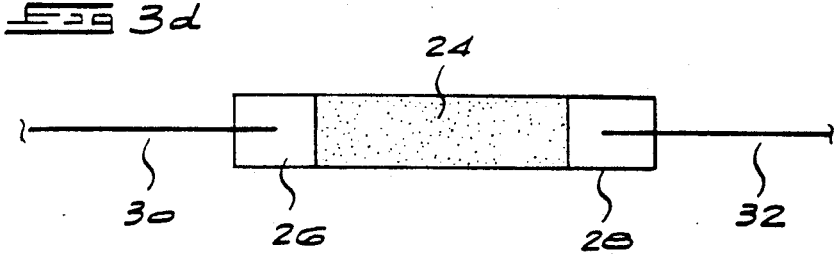

FIGS. 3a to 3d illustrate a second version of a conduction mode neutron detector according to the invention. In FIG. 3a, a silicon substrate 22 is shown, with a layer of polycrystalline diamond 24 deposited thereon by a CVD process. The silicon substrate 22 has a thickness of between 200 and 500 μm, while the diamond layer 24 has, once again, a thickness of between 2 and 30 μm. As shown in FIG. 3b, the central portion of the substrate 22 is now removed, by masking end regions 22.1 and 22.2 of the substrate and etching away the central portion of the substrate with buffered hydrofluoric acid. The result is that the diamond 24 is left unsupported or free-standing in its central region. As shown in FIG. 3c, metal contacts (typically aluminium) 26 and 28 are now applied to the silicon end zones 22.1 and 22.2, and respective conductive leads 30 and 32 are bonded to the contacts 26 and 28. The leads may be of titanium, for example. FIG. 3d shows a bottom view of the finished detector, which has similar dimensions to the detector shown in FIG. 2d.

In a variation of the procedure illustrated in FIGS. 2a to 2d, the diamond layer 12 can be deposited on a thin single crystal of type Ia diamond rather than on a ceramic or PCD substrate. The type Ia diamond crystal has an inferior electronic response, and does not interfere with the conduction mode operation of the detector. In particular, the crystal shows no significant response to incident γ radiation. However, the characteristics of the CVD deposited diamond layer are improved due to epitaxial growth of the deposited diamond on the supporting crystal. However, it should be understood that the type Ia crystal functions here only as a substrate, and does not form part of the detector itself, electronically speaking.

Figure 4:
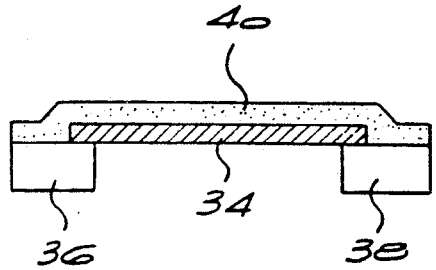
FIG. 4 illustrates a further embodiment of a conduction mode detector according to the invention.

A further version of a conduction mode detector is illustrated schematically in FIG. 4. Here, a strip 34 of a high-temperature polyimide material such as Kapton (trade mark) or an insulating ceramic such as SiN or SiC bridges two portions 36 and 38 of a conductive or semiconductive substrate. The substrate can comprise silicon, for example. A diamond layer 40 is then deposited onto the strip 34 and the end portions 36 and 38, as described above. This version of the detector has the advantage, compared with the version of FIGS. 2a to 2d, that electrical contacts can be applied to the silicon end zones, rather than to the diamond layer itself.

We claim:

1. A neutron detector comprising a layer of polycrystalline diamond material deposited by a chemical vapour deposition process, the diamond material containing a sufficient amount of $^{10}B$ as a dopant to optimize the neutron detection characteristics of the detector.

2. A neutron detector according to claim 1 wherein the $^{10}B$ concentration in the diamond material is 1,000 ppm or less.

3. A neutron detector according to claim 2 wherein the total boron concentration is 5,000 ppm or less.

4. A neutron detector according to claim 1 wherein the layer of diamond material is doped by introducing a gas containing $^{10}B$ into a chemical vapour deposition reaction vessel.

5. A neutron detector according to claim 4 wherein the gas is $^{10}B_2H_6$.

6. A neutron detector according to claim 1 wherein the layer of diamond material is doped by ion implantation with $^{10}B$ ions.

7. A neutron detector according to claim 1 wherein the layer of diamond material is less than 50 μm thick.

8. A neutron detector according to claim 7 wherein the layer of diamond material is between 2 and 30 μm thick.

9. A neutron detector according to claim 1 wherein the concentration of the $^{10}B$ dopant is substantially uniform across the thickness of the layer of diamond material.

10. A neutron detector according to claim 1, wherein the thickness of the diamond is such that the detection rate of γ photons is 0.1% or less.

11. A neutron detector according to claim 1 wherein the layer of diamond material is deposited on a supporting substrate which is not activated by neutron or γ radiation.

12. A neutron detector according to claim 11 wherein the substrate comprises a layer of polycrystalline diamond material.

13. A neutron detector according to claim 11 wherein the substrate comprises a layer of ceramic material.

14. A neutron detector according to claim 11 wherein the substrate comprises a layer of conductive or semiconductive material with a layer of insulating material thereon.

15. A neutron detector according to claim 11 wherein at least a portion of the substrate is removed so that an adjacent portion of the layer of diamond material is exposed.

16. A neutron detector according to claim 14 wherein at least a pair of spaced apart portions of the layer of diamond material are in contact with the substrate, a central portion of the substrate being removed so that the remaining substrate comprises at least a pair of separate substrate portions each in contact with the respective spaced apart portions of the layer of diamond material.

17. A neutron detector according to claim 16 wherein the substrate comprises silicon.

18. A neutron detector according to claim 16 wherein metallic contacts are applied to the separate substrate portions.

19. A neutron detector according to claim 1 wherein spaced apart metallic contacts are applied to the layer of diamond material.

* * * * *